No. 662,209. Patented Nov. 20, 1900.
F. E. WELLS.
TOOL TURRET FOR SCREW MACHINES, &c.
(Application filed July 6, 1900.)
(No Model.)
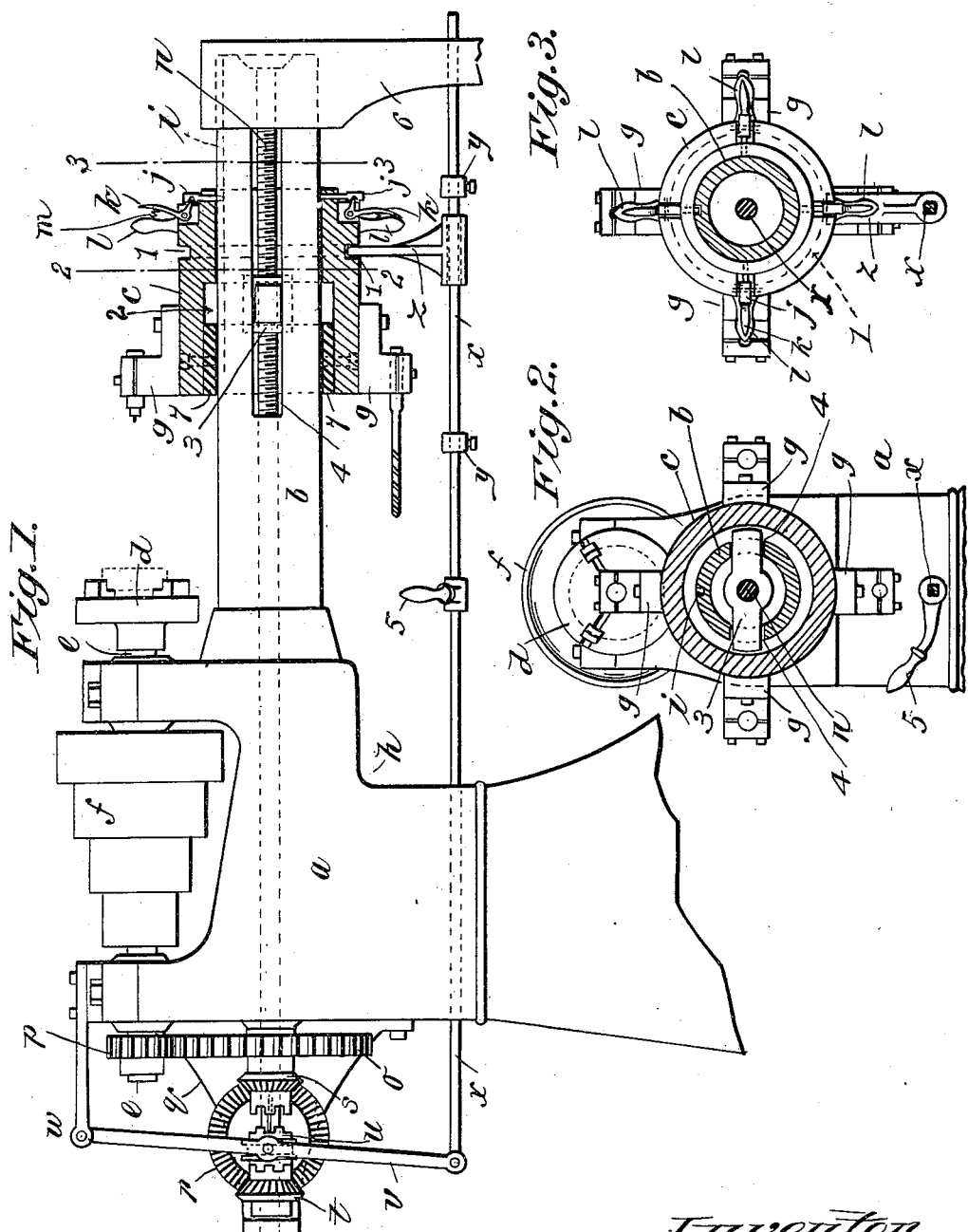
Witnesses:
J. D. Garfield
K. D. Clemons
Inventor.
Frederic E Wells
by Chapin & Co
Attorneys
THE NORRIS PETERS CO., PHOTO-LITHO., WASHINGTON, D. C.

UNITED STATES PATENT OFFICE.

FREDERIC E. WELLS, OF GREENFIELD, MASSACHUSETTS.

TOOL-TURRET FOR SCREW-MACHINES, &c.

SPECIFICATION forming part of Letters Patent No. 662,209, dated November 20, 1900.

Application filed July 6, 1900. Serial No. 22,697. (No model.)

*To all whom it may concern:*

Be it known that I, FREDERIC E. WELLS, a citizen of the United States of America, residing at Greenfield, in the county of Franklin and State of Massachusetts, have invented new and useful Improvements in Turrets for Screw-Machines, of which the following is a specification.

This invention relates to that class of machine-tools comprising lathes, screw-machines, &c., and has for its object improvement in the construction of the tool-holding turret of such machines and the slide on which said turret is supported whereby a much stronger and more rigid construction and a more simple turret feed motion may be attained than in the machines of the above-mentioned type as at present constructed; and the invention consists in the various novel features in the machine, all as hereinafter set forth in this specification and pointed out particularly in the claims appended thereto.

In the drawings forming part of this specification, Figure 1 is a side elevation, partly in section, of a machine embodying this invention. Fig. 2 is a section on line 2 2, Fig. 1. Fig. 3 is a section on line 3 3, same figure.

Many of the usual accessories of the machine-tools of the above-described class are omitted from the drawings, which show, principally, only the parts constituting this invention or coacting therewith as applied to a certain form of lathe.

Referring to the drawings, $a$ represents the frame of the machine; $b$, the turret-slide; $c$, the turret, and $d$ the chuck on the end of the spindle $e$, driven by the cones $f$ in the usual manner.

The turret-slide $b$ is secured to or, if desired, may be an integral part of the frame $a$ of the machine and is turned to a cylindrical form, its axis being parallel with the axis of the chuck-spindle $e$. This slide $b$ is preferably hollow, as shown. The turret $c$ is also of cylindrical form and is adapted to fit closely over the turret-slide $b$ and to have an endwise movement thereon imparted thereto by suitable feed mechanism to be described.

The tool chuck or holder $g$ may be secured to the end of the cylindrical turret, preferably as shown in the drawings, by being bolted to the outside thereof, with the forward end of the holder practically in line with the forward end of the turret. Any style of tool-holder may be employed, and it may be arranged on and secured to the turret, as desired, to adapt the tools to the work to be performed.

The frame $a$ may be cut away underneath the point of juncture of the turret-slide therewith, as shown at $h$, to the end that should the necessity arise for using a long tool opposite a short one, as shown in Fig. 1, the room is provided for the said long tool to advance far enough under the frame to permit the short tool to reach the work in the chuck.

As is usual in machines of this class, the tool-holders $g$ are set on quarters around the turret, and to bring each tool successively into axial alinement with the chuck means are provided for rotating the turret and securing it to the slide $b$ in such position as to effect said alinement, and said means consist in cutting a straight groove $i$, preferably in the upper surface of the slide, and in providing latches $j$, carried on the rear end of the turret and operated by the levers $k$, adapted to engage said groove at the moment the uppermost tool is in line with the axis of the chuck $d$. Near said levers $k$ are the handles $l$, and a suitable spring $m$ is interposed between said levers and handles, which is compressed when the lever is operated to withdraw a latch from the groove $i$ and which throws the latch into the groove when it arrives over the latter.

To rotate the turret, the handle is grasped and the lever pulled toward it by the closing of the hand, and the turret may then be rotated away from or toward the operator, as desired. This is only one of several ways in which the turret may be rotated, and it forms no part of the invention.

Means for moving the turret toward and from the chuck $d$ are provided, and consist in a feed-screw $n$, supported in the frame of the machine and passing axially through the turret-slide $b$. At one end thereof it is connected by gears $o$ $p$ with the spindle $e$, and the end thereof extends beyond the gear $o$ and is supported in a bearing $q$ on a bracket bolted to the frame. On said bracket is a loose running bevel-gear $r$, and on the end of the screw $n$ are two bevel-gears $s$ and $t$, which are in mesh with said bevel-gear $r$. The gear $t$ is loose on the feed-screw, and the gear s is connected with the hub of the gear o and also loose on said feed-screw. The contiguous hubs of said bevel-gears s and t are provided with clutch-teeth, and a sliding clutch u is splined on the screw n and rotates therewith and by a suitable lever v may be thrown into engagement with either of the bevel-gears s and t, whereby rotary movement in either direction may be imparted to the screw by moving the clutch u into engagement with one or the other of said bevel-gears. Said lever v is preferably pivotally attached to the machine, as at w, and the lower end thereof pivotally connected to a square rod x, extending lengthwise of the machine under the turret-slide and supported in any suitable manner in parallelism with said slide. Movable collars y are located on said rod and provided with set-screws, whereby they may be secured to it at any desired point thereon, and a sliding arm z is mounted on said rod between said collars, the upper extremity of which enters an annular groove 1 in the turret. Within the latter is an annular groove 2, within which the ends of oppositely-extending arms of a nut 3 lie, which nut is on the feed-screw n. Said arms of the nut 3 extend through oppositely-located slots 4 in the turret-slide b, whereby it is prevented from turning. This nut, when the feed-screw is rotated, will move the turret endwise on the turret-slide, and it forms the abutment for the tools when the latter enter the work. The feed-screw n, as stated, is rotated by gear connections with the spindle e, and the clutch u, by means of the collars y, is thrown out of engagement with one of said gears s or t at the end of each movement of the turret on its slide in either direction. This is effected by the striking of the arm z against one of them, whereby the rod x is moved longitudinally and the lever v made to actuate the clutch. The distance between the two clutches is such that the movement imparted to the movable clutch u by the turret will only be sufficient to cause its disengagement with one, but not to effect its engagement with the other clutch. Thus at the end of each movement of the turret the operator by grasping the handle 5 on the rod x may throw the clutch u into engagement with that clutch on the bevel-gears s or t which will impart the proper direction of movement to the turret.

Obviously other forms of feed movement for the turret's endwise movements may be employed, if desired.

The end of the turret-slide b is in the drawings shown as supported in the standard 6; but this may be omitted unless the slide is of unusual length.

To provide means for introducing the nut 3 into the annular groove 2 in the turret, the latter is turned out in one end thereof to the full diameter of the bottom of said groove, and after the nut is in place a bushing 7 is inserted into said turned-out end of the turret and secured therein by screws passing through the shell of the turret, said bushing being of such length that the said groove 2 will be formed in the turret after the insertion of the bushing.

Having thus described my invention, what I claim, and desire to secure by Letters Patent of the United States, is—

1. In a machine of the class described, the combination with the frame thereof, of a cylindrical turret-slide, and a turret having a cylindrical bore adapted to have an endwise sliding, and a rotary movement on said slide; substantially as described.

2. In a machine of the class described, the combination with the frame thereof, of a cylindrical turret-slide, a turret having a cylindrical bore adapted to fit said slide, means for moving said turret endwise on the slide, and means for rotating said turret; substantially as described.

3. In a machine of the class described, the combination with the frame thereof, of a cylindrical turret-slide, a turret adapted to fit said slide, tools secured to the exterior of the turret, means for rotating the latter and for locking the same to said slide when one of said tools is in operative position, substantially as described.

4. In a machine of the class described, a frame, a chuck-spindle, a cylindrical turret-slide whose axis is parallel with that of said spindle, a turret adapted to fit said slide, and means for imparting an endwise movement to the turret consisting of a feed-screw located axially of the slide, a nut on said screw engaging said turret, and means for rotating said screw in opposite directions, substantially as described.

FREDERIC E. WELLS.

Witnesses:
RUFUS A. LILLY,
FRANCIS M. THOMPSON.